UNITED STATES PATENT OFFICE.

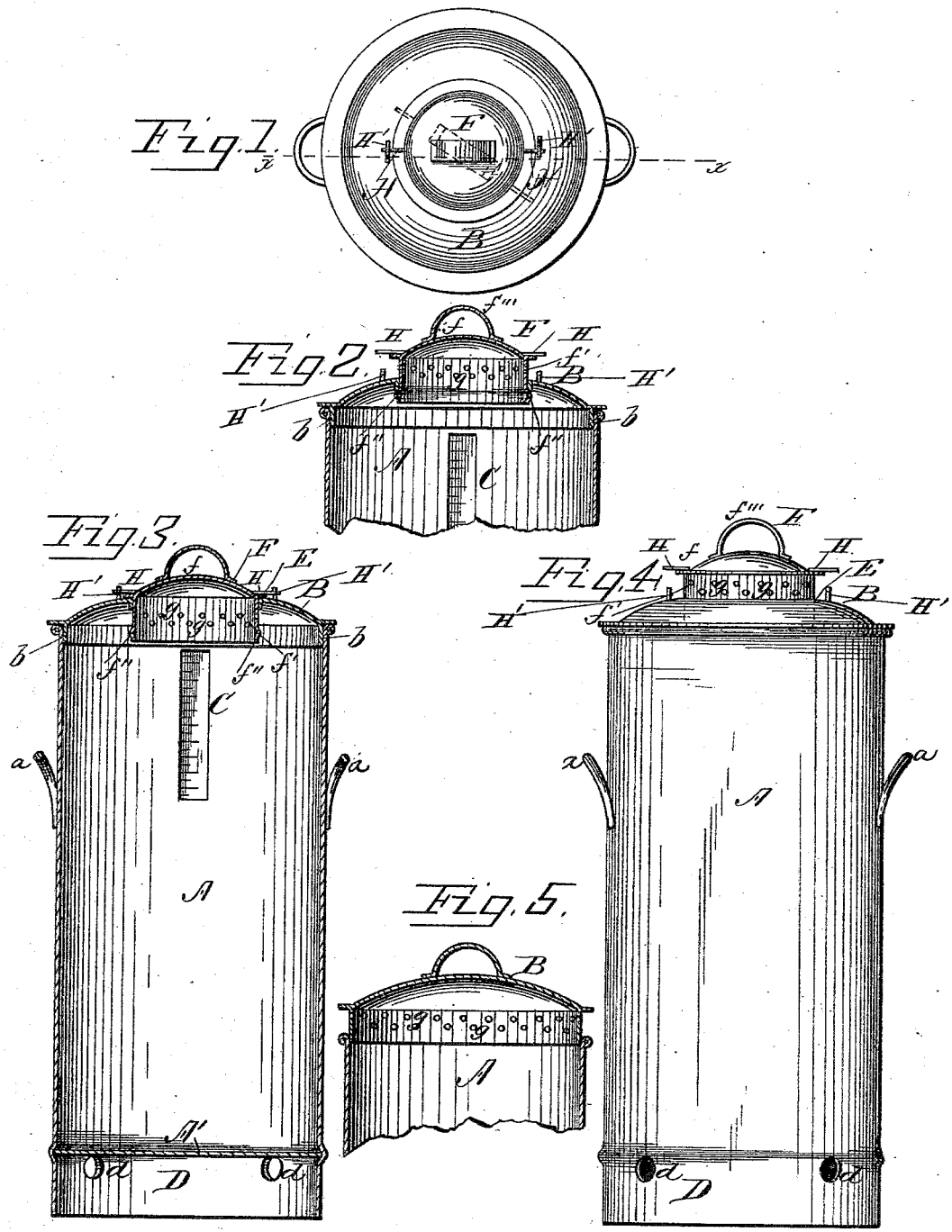

CHARLES G. GRAVES, OF ONEIDA, ILLINOIS, ASSIGNOR OF ONE-HALF TO EDWARD MARSH, OF SAME PLACE.

CREAMER.

SPECIFICATION forming part of Letters Patent No. 274,485, dated March 27, 1883.

Application filed March 4, 1882. (No model.)

*To all whom it may concern:*

Be it known that I, CHARLES G. GRAVES, a citizen of the United States, residing at Oneida, in the county of Knox and State of Illinois, have invented certain new and useful Improvements in Creamers; and I do hereby declare the following to be a full, clear, and exact description of the invention, such as will enable others skilled in the art to which it appertains to make and use the same.

My invention relates to vessels for holding milk while the cream rises, and generally known among dairymen as "creamers," "creaming-cans" or "setters;" and the invention consists in constructions and combinations hereinafter described, and set forth in the claims hereto annexed.

In the accompanying drawings, which illustrate a creamer embodying my invention, and which form a part of this specification, Figure 1 is a top plan; Fig. 2, an enlarged sectional elevation of the lids or covers and of the upper part of the can in line $xx$ in Fig. 1; Fig. 3, a vertical sectional elevation in line $xx$ in Fig. 1; Fig. 4, a side elevation. Fig. 5 is a modification hereinafter referred to.

Referring to the drawings by letters, the same letter indicating the same part in the different figures, letter A represents the body or milk-holding part of the creamer, provided with ordinary handles, $a$, and a lid, B, which fits closely into the top of the body or can A. The body A may be of any desired form; but I prefer it cylindrical, as shown, and the lid B may be attached to the can by its annular part $b$ sliding into the top of the can, as I have shown; or it may be attached in any other ordinary or desired manner.

C is a graduated scale in the side of the can A, for indicating the quantity of cream on the milk in the ordinary manner.

An annular base or rim, D, projects below the bottom A′ of the can A, and has perforations $d$ through it, which perforations, being close to the bottom A′, permit all the air below the bottom A′ to escape when the can is placed in water, and thereby permit the water to come in contact with the bottom A′.

E is a hole or aperture in the central part of the lid B.

F is an auxiliary lid or cover for the hole E. The lid F is formed of a cap or top, $f$, and an annular part, $f'$, projecting downward from the cap $f$, and fitted so that it can be slid in and out of the hole E. An exterior projection, $f''$, on the lower edge of the part $f'$, coming in contact with the lid B, acts as a stop to prevent the part $f'$ being entirely withdrawn from the lid B. The part $f'$ has a series of holes or apertures, $g$, through it.

H are pins projecting radially from the upper surface of the lid F.

H′ are catches on the lid B, arranged with their free or catch ends in opposite directions. When the lid F is slid into the lid B, as shown by full lines at Fig. 3, with the pins H free of the catches H′, about as shown by dotted lines at Fig. 1, the lid F may be turned to bring the pins H beneath the catches H′, as shown, and thereby secure the lids F and B to each other, so that both may be drawn from or put in place on the can A together by taking hold of the handle $f'''$.

The lids B and F are removed from the vessel, as described, to permit pouring the milk into or out of said vessel. When the milk is put into the vessel A the sliding lid F may be drawn up into position, with the perforations $g$ above the lid B, as shown by full lines at Figs. 2 and 4, to permit the heat, gases, and odors in the milk to escape through the holes $g$, and to permit the access of fresh air to the milk through the same holes. While the lid F is up, as last described, its upper imperforate top, $f$, will prevent dirt or other material of any kind dropping or settling from above into the milk. When desired for any purpose the lid F may be slid down into the lid B to the position shown by full lines at Fig. 3, and thereby close the opening E and complete a close cover for the entire top of the can.

It will be evident that the lids B and F may be differently constructed from what I have shown, and, in fact, that the lid F may be dispensed with and the lid B made without the hole E, and with its part $b$ extended and perforated, so that it can be drawn up and nearly out of the can, as shown at Fig. 5, and for the same purpose as the lid F is drawn up; and hence I do not limit my claims to the special method herein described of forming a cover or lid with a sliding perforated part which may be slid out or in, for the purpose described; but

What I claim, and desire to secure by Letters Patent, is—

1. In a creamer, the combination of a body part for holding the milk, and having a removable lid, B, with a hole, E, and an auxiliary lid, F, having an imperforate top, a perforated annular part, $f'$, radial pins H, adapted to engage with catches H' on the lid B, and a handle, $f'''$, by means of which both lids may be removed together and placed on the creamer without withdrawing the lid F from the lid B, substantially as and for the purpose specified.

2. A creamer having an annular base projecting below its bottom, with perforations in said base, close to the bottom, substantially as and for the purpose specified.

In testimony whereof I affix my signature in presence of two witnesses.

CHARLES G. GRAVES.

Witnesses:
GEORGE L. STEPHENSON,
THOMAS A. SCOTT.